United States Patent [19]

Moeller

[11] Patent Number: 4,988,276

[45] Date of Patent: Jan. 29, 1991

[54] APPARATUS FOR SHAPING COOKIE DOUGH

[75] Inventor: Gerth Moeller, Kokkedal, Denmark

[73] Assignee: Nabisco Brands, Inc., East Hanover, N.J.

[21] Appl. No.: 227,522

[22] Filed: Aug. 1, 1988

[51] Int. Cl.⁵ ............................................. B29C 47/00
[52] U.S. Cl. .................................... 425/290; 225/93; 225/96; 225/97; 225/103; 425/296; 425/307; 425/308; 425/376.1
[58] Field of Search ............... 425/239, 238, 240, 241, 425/290, 291, 289, 308, 315, 311, 131.1, 131.5, 376.1, 377, 290, 296, 307; 264/156, 142, 138, 139, 167, 171, 163; 426/496, 503, 144, 560, 518, 513, 516, 94, 507, 142; 225/97, 94, 105, 103, 94, 97, 103, 96, 93

[56] References Cited

U.S. PATENT DOCUMENTS

| 518,891 | 4/1894 | Manwaring . | |
| 865,791 | 9/1907 | Meier | 264/167 |
| 1,657,457 | 1/1929 | Copland | 222/343 |
| 1,879,327 | 9/1932 | Kremmling | 426/503 |
| 2,429,042 | 10/1947 | Bader | 107/54 |
| 2,818,097 | 12/1957 | Glanz | 146/203 |
| 2,840,129 | 6/1958 | Jovis | 146/72 |
| 2,979,095 | 4/1961 | Jovis | 146/72 |
| 3,085,296 | 4/1963 | Meinicke | 19/81 |
| 3,119,428 | 1/1964 | Katzenstein | 146/72 |
| 3,158,486 | 11/1964 | Morck et al. | 99/86 |
| 3,192,975 | 7/1965 | Noel | 146/72 |
| 3,192,976 | 7/1965 | Clock | 146/241 |
| 3,704,735 | 12/1972 | Noel et al. | 83/2 |
| 3,714,310 | 1/1973 | Gaffney et al. | 264/167 |
| 3,733,942 | 5/1975 | Noel | 83/2 |
| 3,737,084 | 6/1973 | Noel | 225/97 |
| 3,828,995 | 8/1974 | Shorin et al. | 225/94 |
| 3,956,517 | 5/1976 | Curry et al. | 426/502 |
| 4,022,918 | 5/1977 | Miller | 426/446 |
| 4,069,581 | 1/1978 | Gray | 30/114 |
| 4,109,023 | 8/1978 | Rucker et al. | 426/549 |
| 4,159,662 | 7/1979 | Weaver | 83/867 |
| 4,159,662 | 7/1979 | Weaver | 83/867 |
| 4,222,510 | 9/1980 | Kouloumbini et al. | 225/94 |
| 4,287,801 | 9/1981 | Hanson | 83/871 |
| 4,511,318 | 4/1985 | Kolodesh et al. | 425/133 |
| 4,517,209 | 5/1985 | Thornton et al. | 426/383 |
| 4,530,849 | 7/1985 | Stanley et al. | 426/439 |
| 4,562,084 | 12/1985 | McKee | 426/502 |
| 4,583,439 | 4/1986 | Reesor | 83/867 |
| 4,584,203 | 4/1986 | DuVall et al. | 426/549 |
| 4,609,555 | 9/1986 | Becher et al. | 426/94 |
| 4,643,904 | 2/1987 | Brewer et al. | 426/549 |
| 4,668,523 | 5/1987 | Begleiter | 426/104 |
| 4,677,888 | 7/1987 | Terragnoli | 83/862 |
| 4,725,444 | 2/1988 | Wilkins | 426/280 |
| 4,734,293 | 3/1988 | Pivonka | 426/502 |
| 4,741,916 | 5/1988 | Heidel et al. | 426/549 |
| 4,743,458 | 5/1988 | Gellman et al. | 426/549 |

OTHER PUBLICATIONS

Two page article on "Peanut-Butter Crisscrosses", Family Circle, Rockville House Pub., Garden City, N.Y. (1978) (exact date and page unknown).

Primary Examiner—Willard Hoag

[57] ABSTRACT

Apparatus is provided for making a cookie preform from a continuous cookie dough rope by inserting finger means into said rope in a direction generally transverse to a longitudinal axis of said rope and displacing at least selected ones of said finger means at a velocity relative to the velocity of said rope sufficient to stretch said rope to the breaking point to separate said portion from said rope, whereby said portion has at least one surface formed by said stretching action to have a coarse appearance.

14 Claims, 7 Drawing Sheets

APPARATUS FOR SHAPING COOKIE DOUGH

TECHNICAL FIELD

The present invention generally relates to baked food products, preforms for making baked food products, and methods and apparatus for making preforms that can be subsequently baked to final food products. In one particularly preferred embodiment, the invention provides cookies and cookie dough preforms containing visible pieces of particulate edible matter. In another particularly preferred embodiment, the invention provides cookies of a structure having a coarse, multipeaked, or crumble-type top surface with a highly variegated topography, which cookies may or may not contain pieces of particulate edible matter.

For convenience, the invention will be described with reference to cookies, but it is to be understood that the term "cookies" as used herein is intended to generically cover the broad class of baked products such as cookies, biscuits, and similar baked products. Accordingly, the use of the term "cookie" herein should be so construed.

BACKGROUND OF THE INVENTION

Home-baked cookies are generally characterized by a random, non-uniform topography. The topography is developed by hand-shaping, by dropping dough pieces onto a flat surface by means of a fork or spoon, and by patting the dough piece.

In a known method for making cookie preforms on a mass production basis, an appropriately formulated dough is rolled between cylindrical rollers of which one or both have recesses corresponding to the desired shape of the cookie preforms to thereby cut the dough to the desired shape and mold the surface of the preform. While this technique, known as "rotary molding", makes it possible to obtain a regular and uniform surface texture, if the cookie preform is desired with an embossed pattern, the rolling process can also result in a compression of the dough that affects the taste qualities of the resulting cookie. Moreover, the preforms and resulting baked cookies each look alike because they are made from the same mold.

It is also known to use a wire-cutting operation, whereby an appropriately formulated dough is fed from a hopper downwardly through one or more nozzles located above a conveyor belt. As the dough leaves a nozzle, a cutting wire is passed through the dough so that discrete pieces of dough (hereinafter referred to as "dough preforms" or "preforms") are separated from the dough mass and fall down onto the conveyor belt. The preforms on the conveyor belt may then pass through an oven for prompt baking, or the preforms may be collected from the conveyor belt for later baking. Wire-cut preforms and cookies baked therefrom have a generally flat top surface and a "rougher" appearance than rotary molded products. The baked cookies sometimes have numerous cracks over the surface, believed to be formed by gases, e.g. $H_2O$, $CO_2$, and $NH_3$, escaping from the interior of the dough mass during the baking step. However, the surface topography is generally flat or uniformly curved.

Cookies that contain pieces of particulate edible matter, typically flavorings such as chocolate chips, nut, and fruit pieces and the like (hereafter referred to as "food particles"), provide texture and taste variability and disrupt cookie surface. However, only very small food particles can be included in a dough if it is to be subjected to a conventional wire-cutting operation. Larger food particles will frequently cause breakage of the cutting wire or the particles may be forced out of the dough by the wire as it passes through the dough across the nozzle. This results in a waste of food particles. The large particles may prevent the wire from cutting all the way through the dough resulting in random tearing of portions of the dough piece. Also, as the wire encounters relatively large particles, the wire may cause excessive lateral movement of a given dough piece or non-uniform lateral movement from dough piece to dough piece. Random displacement of the severed dough pieces results in a non-uniform arrangement of the dough pieces on the conveyor belt or band upon which the dough pieces land. The non-uniform arrangement of the pieces can lead to dough piece transfer problems with respect to other belts or non-uniform baking of the pieces in a band oven. It has been proposed to add larger particles to a wire-cut cookie preform by sprinkling the particles over the preform surface prior to baking, but in this way only limited amounts of particles can be added and there is a risk that a substantial number of particles will fall off the surface and result in wastage of materials.

It has also been suggested to produce cookie preforms incorporating large food particles by extending a cookie dough containing the particles through a nozzle very slowly and at the same time not allowing the cutting wire to cross the whole of the nozzle. This reduces the chance of breakage of the wire, but only allows for very slow production rates. Various other techniques have been proposed for modifying wire-cutting apparatus in order to produce cookies containing large food particles, such as for example by using an oscillating cutting wire or a rigid cutting knife.

In yet another known process for preparing cookie preforms, the dough is advanced through a narrow, movable nozzle. This method can be unsuitable with dough containing larger food particles, which often may block the nozzle.

Yet another known method of incorporating food particles into a cookie preform includes the steps of continuously forming a dough rope extrudate having particles randomly distributed therein, laying the dough rope on a conveyor belt, and then slicing the dough rope into a series of individual dough preforms. In this process the upwardly facing side of the dough rope on the conveyor belt will produce the top surface of the final cookie. Therefore, this process is limited to the manufacture of cookies having a substantially rectangular or rhombic surface, unless the preform is subjected to additional and costly forming operations. In contrast, wire-cutting and other known processes as discussed above make it possible to directly manufacture cookie preforms of any desired outer shape, such as a circular shape.

U.S. Pat. No. 4,643,904 discloses a variation of the rope-laying process described above, in which a continuously moving dough rope containing randomly distributed food particles is penetrated with pins or various disk mean that engage and transversely move a portion of the randomly distributed particles through a preselected, peripheral area of the continuously moving dough rope that corresponds to a preselected surface of the baked products. In this way higher particle visibility is obtained in the baked products, but it is still only possible to make cookies having a substantially rectangular or rhombic surface with this method.

Muffin splitting or tining is known in the art as shown for example in U.S. Pat. Nos. 2,818,097 and 3,704,735. However, the considerations of such processes are different from the considerations of preparing cookie preforms from cookie dough.

We have now found that it is possible to provide a cookie preform resulting in an improved structure and surface texture of a cookie baked therefrom.

We have also found it possible to provide a cookie preform containing pieces of particulate edible matter, which pieces are generally highly visible on the surface of a cookie baked therefrom.

We have further found it possible to provide an improved method and apparatus for preparing cookie preforms on a mass production basis that are bakeable to a coarse, multi-peaked top surface, wherein the peaks are generally formed in random locations from piece to piece.

SUMMARY OF THE INVENTION

The present invention provides a process for making a cookie preform. In this process, a portion of a mass of cookie dough is separated from a remainder of the mass of cookie dough by first reducing the cohesion of said mass of cookie dough at a plurality of selected, distinct positions within a zone intersecting the dough mass, and then moving a mass of dough on one side of said zone relatively away from a mass of dough on the other side of said zone, whereby the dough mass is first divided at said plurality of positions of reduced cohesion and then gradually pulled to breaking at remaining interlying sections of said zone to separate the portion of said mass of cookie dough.

The process of the present invention provides a number of distinct weakened areas, which are formed within the dough mass, whereby the dough mass will separate or "open", generally without any substantial pulling force being necessary, whereas in the interlying non-weakened areas of the dough mass the initial cohesiveness is retained so that the dough mass will be stretched when a pulling force is applied. In this way, selected discrete regions of the dough mass will be stretched when moving the two portions of dough mass away from each other. While not wishing to be bound by theory, it is believed that in those stretched sections there may be a large proportion of surface cracks or fractions or a more open structure of reduced density than in the unstretched regions where the dough mass was first weakened.

The manner in which the dough cohesiveness is reduced at a plurality of selected, distinct positions may be as a result of any suitable force, such as for example pneumatic force or air or liquid jets, mechanical force or combinations thereof, or lasers, but most preferable are mechanical means such as pins that perforate the dough mass either partly or completely. The portions of dough may be moved away from each other by gravity, but preferably mechanical means, such as pins, are inserted into the dough mass to pull the two portions of dough apart from each other. Such mechanical means are preferably the same mechanical means by which positions of reduced cohesiveness are provided within the mass of dough.

In a particularly preferred embodiment, two sets of pins each comprise a plurality of substantially parallel pins or fingers, which are inserted into the dough mass from opposite sides thereof to provide a plurality of substantially parallel perforations in a plane intersecting the mass of dough. The two sets of pins are then moved simultaneously relative to said dough mass in a direction generally perpendicular to said plane, thereby pulling the dough mass so that it separates in the sections interlying said perforations in said plane.

In yet another embodiment of the present invention a process is provided for making a cookie preform from an elongate mass of cookie dough, said process comprising the steps of inserting elongate penetration means into said dough and then moving said mechanical means relative to said dough in the longitudinal direction of said elongate mass of dough to separate a portion of dough from said elongate mass of dough. This dough constitutes said cookie preform. In this process, the inserted elongate penetration means exert a longitudinal pulling and supporting force, but without substantially affecting the cross-sectional shape or size of the resulting cookie preform.

In a preferred embodiment, the penetration means comprise pins as described above. In particular, when the pins are in the form of sets comprising a plurality of substantially parallel pins or fingers, the process may be used for making a cookie preform having a top face, a bottom face, and interconnecting side faces, wherein patterns of substantially parallel ridges or peaks and grooves are formed in the surfaces of each of said top and bottom faces. Furthermore, when the cookie dough comprises relatively large pieces of particulate edible matter, such as morsels or inclusions, such pins are generally not likely to break, and in contrast to a wire in a wire-cutting operation, the lateral movement of the severed dough pieces would be substantially reduced upon encountering of the particulates by the pins.

In a particularly preferred embodiment of the process of the present invention, two sets of pins each comprise a plurality of substantially parallel pins or fingers and are inserted into the elongate dough mass from opposite sides thereof to provide a plurality of substantially parallel perforations in a plane intersecting the mass of dough. Thereafter these two sets of pins are moved simultaneously relative to the elongate mass of cookie dough in a direction generally perpendicular to said plane to pull the dough mass to the breaking point in the sections interlying said perforations in said plane. This embodiment is particularly useful when the dough contains larger food particles, which if engaged by one or more fingers tend to be moved in one direction by the fingers of one set of pins and in the opposite direction by the fingers of the other set of pins, whereby the particles tend to stay inside the dough. By suitable arrangement of the fingers, this action of moving pieces of edible matter from both sides may also result in a larger concentration of pieces in the surface of the resulting cookie preform, thereby increasing the amount of visible pieces. When the cookie dough comprises food particles, the elongate mechanical means such as fingers or other forms of pin means are preferably blunt-ended so as to not pierce such pieces. The spacing between the pins or fingers is preferably such that pieces of edible matter move freely without being squeezed. If the cookie dough does not contain food particles, said elongate penetration means may have tapering ends for insertion into the dough, if desired.

In yet another embodiment of the present invention, there is provided apparatus for forming cookie preforms from an elongate mass of cookie dough, which may optionally contain pieces of particulate edible matter. The apparatus comprises elongate penetration means arranged to perforate a mass of dough. The penetration means may be moved at least partially in a longitudinal direction of said mass of dough to thereby separate a portion of dough from said elongate mass of dough, which portion constitutes the cookie preform.

In a preferred embodiment of the apparatus of the invention, two sets of pins comprise substantially parallel pins or fingers and are arranged to move from a first position where each set of pins is on opposite sides of an elongate mass of cookie dough to a second position wherein said fingers perforate said elongate mass of cookie dough from the two opposed sides thereof in a transverse plane. The pins are further arranged to move relative to said mass of cookie dough in a direction generally perpendicular to said transverse plane, to thereby separate the dough mass in said plane to separate a portion of dough as the cookie preform.

In a further aspect of the present invention a cookie preform is provided from a cookie dough, the dough mass having a plurality of discrete regions extending from a surface of said preform. The dough mass in said plurality of discrete regions is expanded so as to have a multitude of cracks or fissures or reduced density relative to that of the surrounding dough mass. The expanded, discrete regions of reduced density are discrete portions or areas, so that in the vicinity of these regions the dough mass will have a more "open" structure than in the remainder of the preform.

Although the present invention should not be limited to any specific theory, it is believed that the expanded discrete regions of reduced density create passages facilitating the escape of gases evolved during baking. Such gases are typically water vapor. When baking powder is used as a leavening agent, the gases are typically carbon dioxide.

The content of water should preferably be reduced during baking to a maximum of 3% by weight, because this appears to be a controlling factor for complete baking of the crisp variety products. If such a low water content is not obtained during the baking, the final product may be uncrisp or tacky inside. When ammonium bicarbonate is incorporated into the dough, it is generally important that substantially all ammonia be expelled from the dough during baking, as otherwise this may undesirably affect the taste of the final cookie. In the production of soft variety cookies, the moisture content of the final product should typically be at least about 6% by weight. The cookies of the present invention should have a water activity of less than about 0.7, preferably less than about 0.65.

It has been found that, for a given dough weight, a cookie preform in accordance with the present invention often requires a shorter baking time than a cookie preform prepared on conventional wire-cutting apparatus. Also, because of the shorter baking time, the invention makes it possible to uniformly bake without excessive browning or scorching "higher" or thicker cookies compared to cookies prepared from conventional wire-cut preforms. It is believed to be more difficult for gases to escape during baking of wire-cut preforms. The cookie preform of the present invention may suitably have a thickness at its thinnest point of from about ⅜" to about 1".

It has furthermore been found that in accordance with the invention it is readily possible to control cracking in the surface of the final cookie by appropriately distributing the regions of a more open structure in the preform. "Control" means that cracks may be mainly confined to selected surface portions of the final cookies or eliminated altogether.

The depth and width of the surface valleys or grooves in the baked good or preform may be controlled to accommodate fillings or coating material. Exemplary of these materials are chocolate, compound coatings, fruit-based fillings, and the like. By keeping enrobing or filling materials substantially only within the cracks or valleys, sticking of the cookies to each other during adverse transport conditions may be reduced or eliminated. The enrobing or filling materials may be applied before or after baking. They may be removed from the peak or ridge portions of the cookie by a blast of air before the materials completely harden or set.

In a further embodiment of the present invention, there is provided a cookie preform having a top face, a bottom face and interconnecting side faces, wherein patterns of substantially parallel ridges and grooves are formed in at least the surfaces of said top or bottom faces. This pattern of substantially parallel ridges and grooves provides an enlarged surface area of the cookie preform and in this way the subsequent baking time can be shortened relative to a flat wire-cut cookie of similar size and weight. Preferably such a cookie preform may contain pieces of particulate edible matter, of which a substantial amount may be advantageously visible on the top surface.

BRIEF DESCRIPTION OF THE DRAWINGS

Preferred features and embodiments of the invention will now be further illustrated with reference to the following drawings wherein.

DETAILED DESCRIPTION OF THE PREFERRED EMBODIMENT

As used herein, the term "cookie" is intended to include any baked product being similar to a cookie such as cookies, biscuits, and the like. Similarly, the term "cookie dough" is intended to mean any dough that is suitable for making cookies within the broadest meaning of that term. Such a dough is usually an unbaked mixture of ingredients typical for a cookie dough such as flour, shortening (such as for example margarine or butter), fat, and water. In addition, the dough may contain a leavening agent, e.g. baking powder containing sodium bicarbonate or ammonium bicarbonate. When desired the dough may also contain a sugar, such as sucrose and mixtures thereof.

The dough may contain any kind of pieces of particulate edible matter (also referred to as food particles, flavor chips, inclusions, and morsels) that are either solid or semi/solid, e.g. chocolate chips, peanut butter chips, caramel chips; fruit pieces or dehydrated fruit pieces such as orange, banana, strawberry, apples, pineapples, mangoes, raisins, currants or sultanas; nuts or pieces of nuts such as pecan nuts, hazelnuts, walnuts, peanuts or other types of nuts; hard or soft candy pieces; or mixtures of particulate flavoring ingredients.

The term "dough preform" or "preform" is intended to mean a portion or piece of a raw dough as defined above, being suitable for baking into a final cookie.

In the following detailed description of the present invention, the illustrated cookie dough extrusion apparatus is generally conventional except for the dough severing or dividing mechanism. The conventional dough extrusion apparatus is commercially available from, for example, Meincke Food Processing Equipment A/S, Skovlunde, Denmark. Accordingly, conventional components found in commercial manufacturing lines have only been shown and discussed to the extent necessary to enable a person skilled in the art to embody the invention. For components having similar functions in the various embodiments illustrated, the same numerals have been used throughout the drawings.

Figure 1:
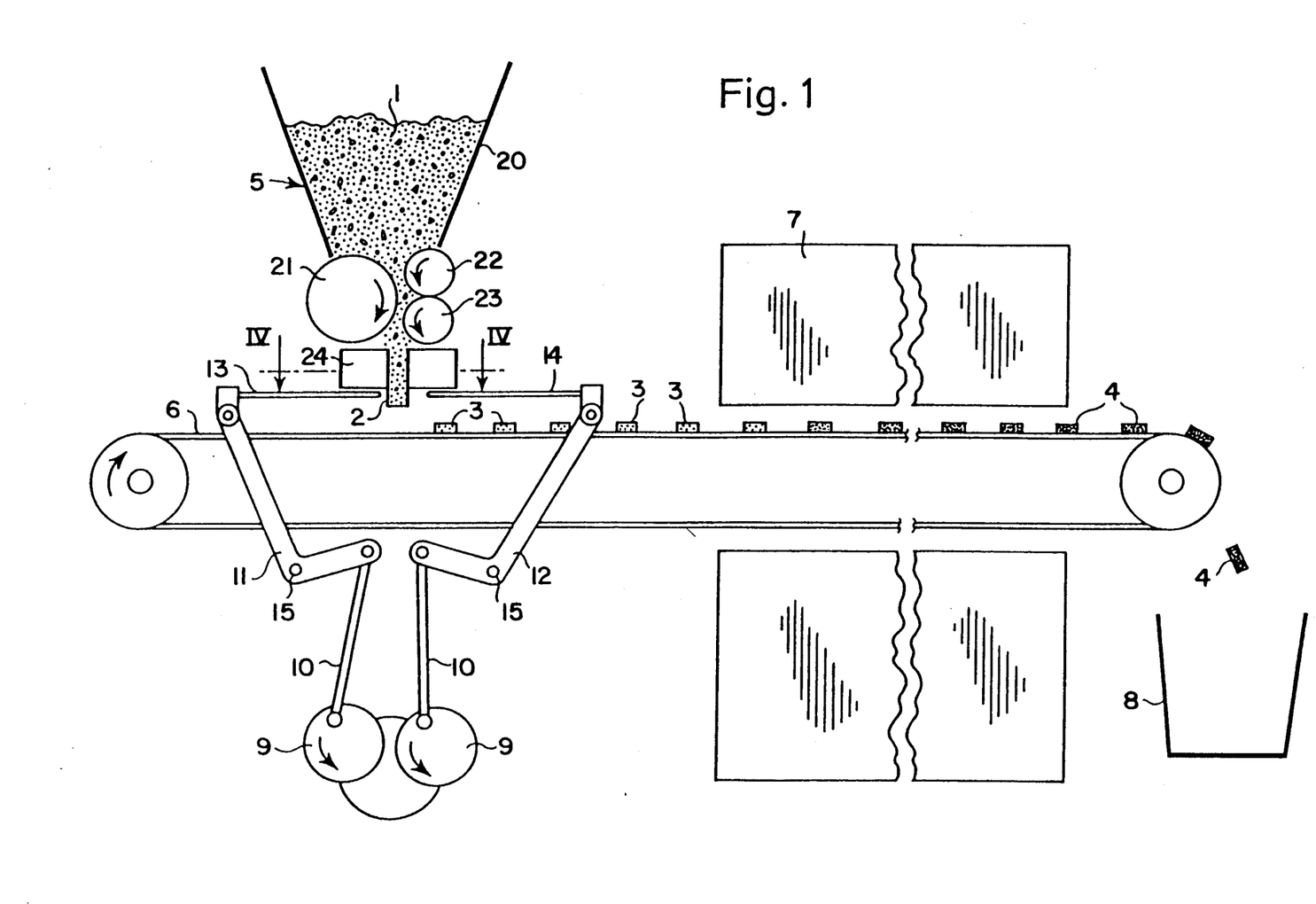
FIG. 1 is a schematic cross-sectional view of cookie manufacturing apparatus according to the invention, wherein two sets of pins are used in practicing the invention.

FIG. 1 is a schematic cross-sectional longitudinal view of cookie manufacturing apparatus comprising a horizontal conveyor belt 6 on which cookie preforms or pieces of dough 3 are carried through an oven 7, wherein they are baked and wherefrom baked cookies 4 emerge and drop from the end of conveyor belt 6 into a receptacle 8 for finished cookies. Alternatively, preforms 3 could be stored, e.g. frozen for later baking, thereby omitting the oven 7. FIG. 1 further shows dough feeder 5 comprising a dough hopper 20 containing a suitably prepared dough 1, wherefrom the dough is carried downwards by means of a dough feed roller 21 in combination with an upper idle roller 22 and a lower idle roller 23. In an alternative embodiment, the rollers 22 and 23 could be replaced by a single roller (not shown). At the bottom 24 of feeder 5 a plurality of nozzles may be arranged as illustrated by numeral 25 in FIG. 4. Each nozzle 25 produces a vertical dough rope 2 as illustrated in FIG. 1. A preform is separated from dough rope 2 by sets of pins 13, 14, and such sets are described in further detail below. Conveyor belt 6 moves continuously in the direction of the arrow and, for convenience in distinguishing the two sets of pins, pins 13 will hereinafter be described as being rearward of dough rope 2 and pins 14 will hereinafter be described as being forward of dough rope 2. Rearward pins 13 and forward pins 14 are driven from common motor driven cranks 9 by means of respective connecting rods 10 and respective crank levers 11 and 12.

Figure 2:
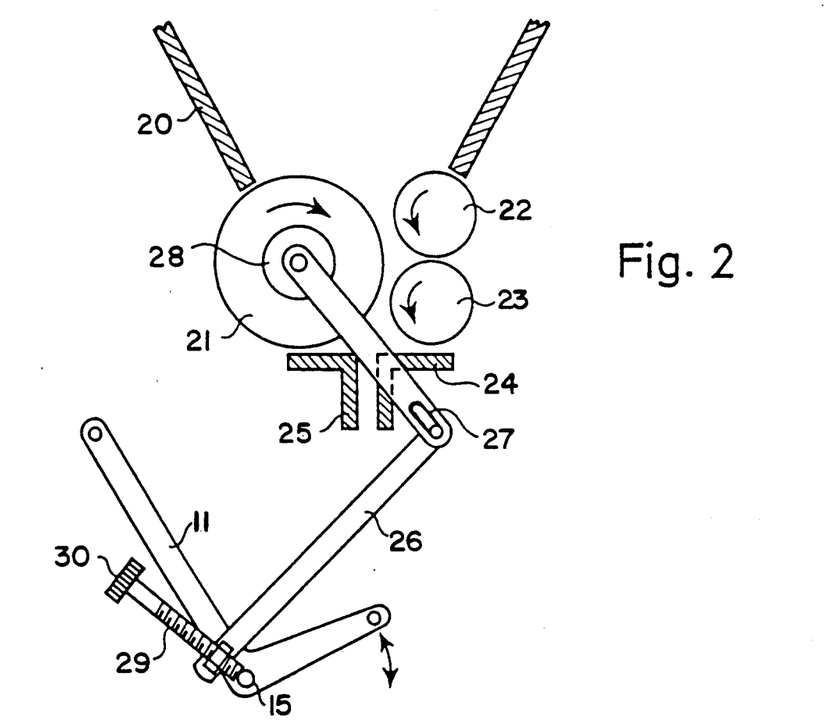
FIG. 2 is an enlarged schematic cross-sectional view of the dough feeding mechanism of the apparatus illustrated in FIG. 1.

Part of the dough feeder mechanism is shown in further detail in FIG. 2 from which it will be seen that the dough feed roller 21 is connected to a dough feeder lever 27 operated by a dough feeder connecting rod 26 from crank lever 11 in such a manner that lever 27 alternates between a forward position and a rearward position of which the forward position is illustrated in FIG. 2. Dough feeder lever 27 is connected to the dough feed roller 21 by means of an overrunning clutch 28 so that lever 27 turns the dough feed roller 21 clockwise when being moved from its forward position illustrated in FIG. 2 to its rearward position. When dough feed lever 27 is moved in the opposite direction, dough feed roller 21 remains stationary. As the dough feed lever 27 moves forward and backwards, the dough feeder roller 21 is periodically advanced with intermediate stationary periods. The intermittent movements of roller 21 advances the dough. At the same time, idle rollers 22 and 23 are turned counter-clockwise as illustrated by arrows. Dough feeder connecting rod 26 is connected to the crank lever 11 by a dough feeder adjustment screw 29 for adjusting the effective stroke of connecting rod 26 by turning handle 30. Thereby the amount of dough dispensed in each cycle may be adjusted as necessary.

Figure 3:
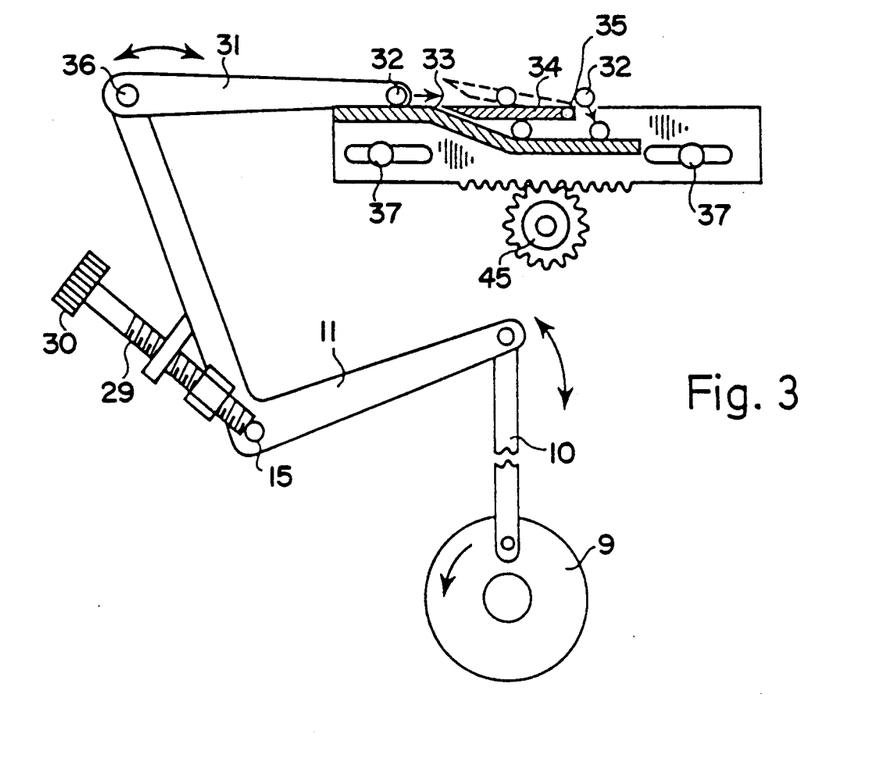
FIG. 3 is an enlarged schematic cross-sectional view of the drive mechanism for one set of pins of the apparatus illustrated in FIG. 1.

FIG. 3 illustrates the mechanisms for operating the sets of rearward pins 13 and forward pins 14, which divide cookie preforms from dough rope 2. The mechanism shown in FIG. 3 controls the set of rearward pins 13, whereas a similar mechanism controls forward pins 14 as illustrated in FIGS. 1 and 4.

With reference to FIG. 3, connecting rod 10 is driven by motor driven crank 9 to pivot crank lever 11 upwards and downwards in an oscillating motion around a crank lever stationary pivot 15. A pin set lever 31 is connected at one end to the top end of crank lever 11 by means of pivot 36 and is supported at the other end by lever roller 32, which rolls on a system of rails. The system of rails comprises a fixed rail 33 and a pivoted rail section 34 that is hinged at pivot 35 and spring loaded downwards in a conventional fashion (not shown). From the position illustrated in FIG. 3, when connecting rod 10 is moved downwards by crank 9, pin set lever 31 moves in the direction of the arrow. Thereby roller 32 rolls on a portion of fixed rail 33 and continues on the top side of pivoted rail 34 until the end of rail 34, where roller 32 falls down as illustrated by various positions of roller 32 in FIG. 3. When roller 32 falls down and hits the fixed rail 33, pin set lever 31 starts to move in the opposite direction because crank 9 has turned to a position where connecting rod 10 moves upwards. When pin set lever 31 moves in said opposite direction, roller 32 passes below the underside of pivoted rail 34 and rolls along the inclined portion of fixed rail 33. As roller 32 moves toward its first position by lifting pivoted rail 34 as illustrated by dotted lines in FIG. 3, pivoted rail section 34 then falls back to its original position.

The entire rail system is supported in a slidable fashion, so that it may be adjusted horizontally by guide means 37 to the left or to the right of FIG. 3 by turning adjustment screw 45. In this manner, the time when roller 32 falls down on fixed rail 33 can be easily and conveniently adjusted.

Figure 4:
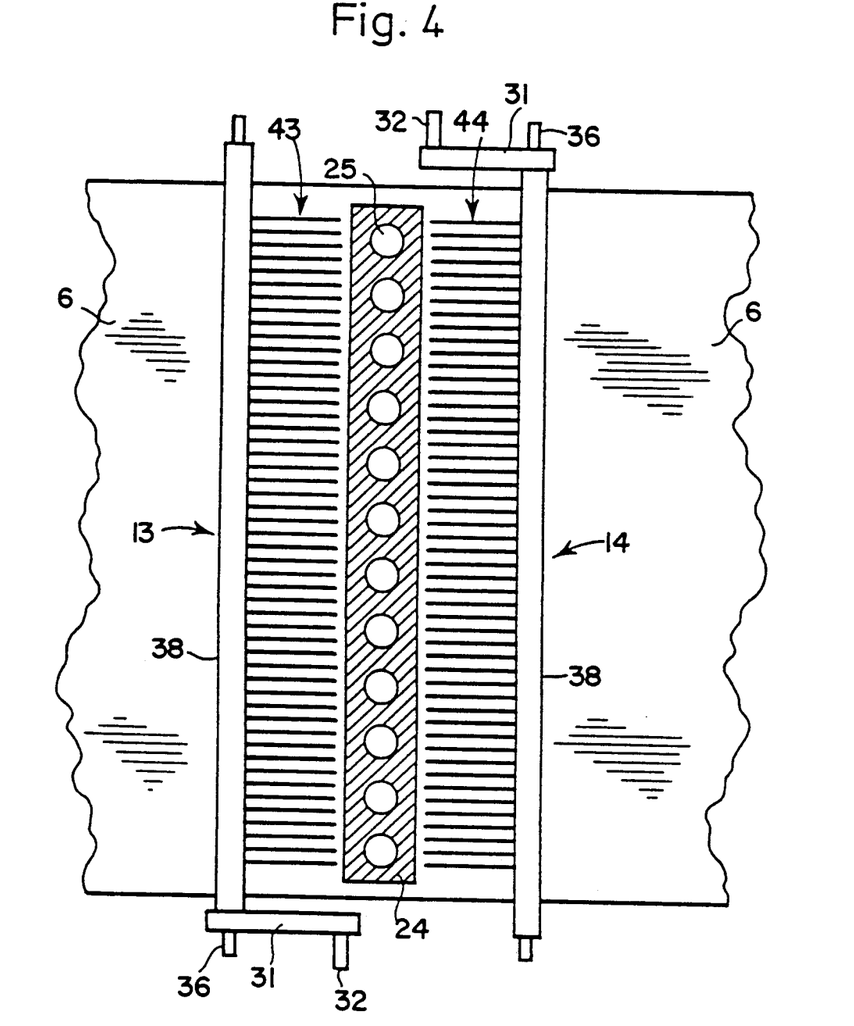
FIG. 4 is an enlarged, horizontal sectional view showing two sets of pins in a retracted position in the apparatus of FIG. 1.

FIG. 4 illustrates two sets of pins or forks in a horizontal sectional view along line IV—IV in FIG. 1. FIG. 4 shows twelve nozzles 25 arranged on a line across the conveyor belt 6. Rearward pins 13 comprise a large number of parallel pins 43, each being attached to a bar 38 that is rigidly attached to lever 31. It is understood that when lever 31 and roller 32 perform the movements explained in connection with FIG. 3, bar 38 with fingers 43 will perform a similar movement. When roller 32 reaches the end of pivoted rail 34, roller 32 falls downwardly under influence of the weight of bar 38 and pins 43. Similarly, pins 14 comprise a bar 38 to which a large number of parallel pins 44 are attached. Pins 14, by movement similar to that explained in connection with FIG. 3, will perform a similar movement as pins 13. By having pins 13 and 14 driven synchronously from the two cranks 9 illustrated in FIG. 1, it will be understood that fingers 43 and fingers 44 are moved simultaneously from the positions illustrated in FIG. 4 to a position where the two sets of fingers are intermeshed. From the latter position, each set of fingers falls down for a distance determined by the fall of rollers 32, wherefrom the fingers retract to the position illustrated in FIG. 4.

When rollers 32 fall, the pins 43 and 44 rotate about an axis that corresponds to bars 38. Pin 43 rotate about bar 38 in a first direction, e.g., clockwise, while pins 44 rotate about its corresponding bar 38 in an opposite direction, e.g., counterclockwise. Such motion is further discussed with respect to FIG. 7C below.

Figure 5:
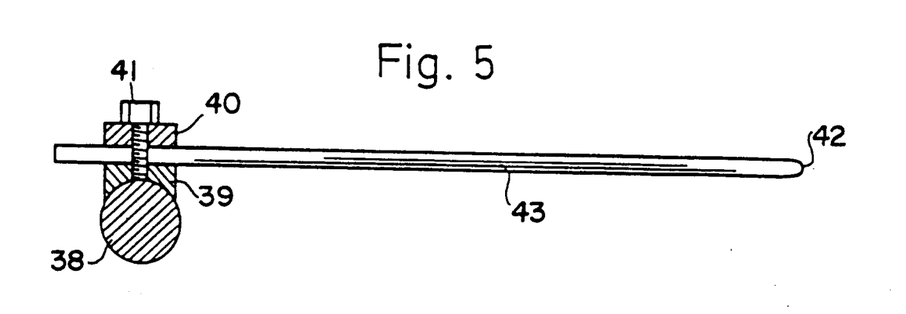
FIG. 5 is an enlarged side elevation of a pin illustrated in FIG. 4.

In FIG. 5 a finger 43 of pins 13 is shown having a blunt end 42 as preferred when the cookie dough contains food particles. The opposite end of finger 43 is attached to bar 38 by means of pin supporting block 39, pin clamping bar 40, and pin clamping screw 41. By this arrangement individual pins can be replaced if they are damaged or if it is desired to use a different type or size of fingers.

Figure 6A:
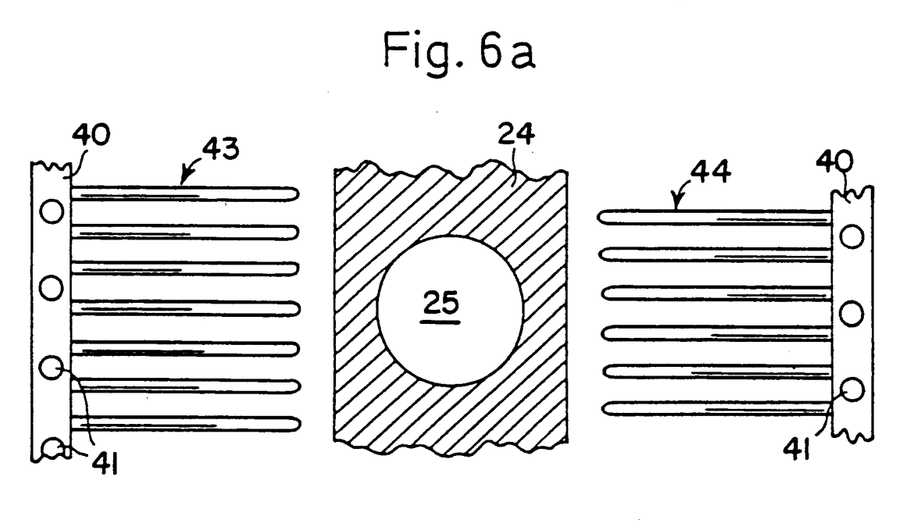
FIG. 6a is an enlarged horizontal sectional view showing portions of the sets of pins illustrated in FIG. 4.
Figure 6B:
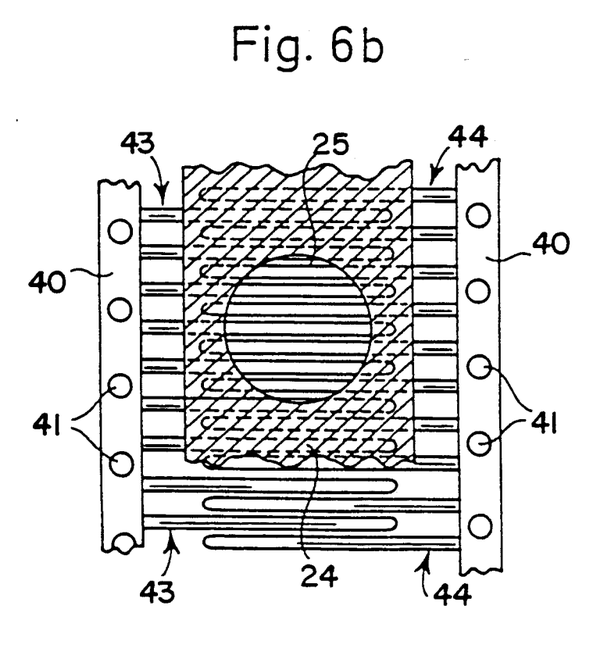
FIG. 6b is similar to FIG. 6a, but illustrating the pins in a different position as intersecting a mass of dough.

FIG. 6a is a horizontal sectional view similar to FIG. 4, but on a larger scale showing the pins or tines in the region near a nozzle 25, the fingers 43 and 44 being in a retracted position. FIG. 6b shows the same fingers in an advanced position, wherein the fingers are arranged in an interdigitating or intermeshing fashion with a narrow spacing between individual fingers. In one preferred embodiment, the diameter of the nozzle opening is 38 mm and the fingers are round steel bars each having a length of 220 mm, a diameter of 3–4 mm, and arranged with a distance from outside edge to corresponding outside edge of 10–12 mm. The spacing between fingers of opposite sets of pins may therefore be on the order of 2 mm.

Figure 7A:
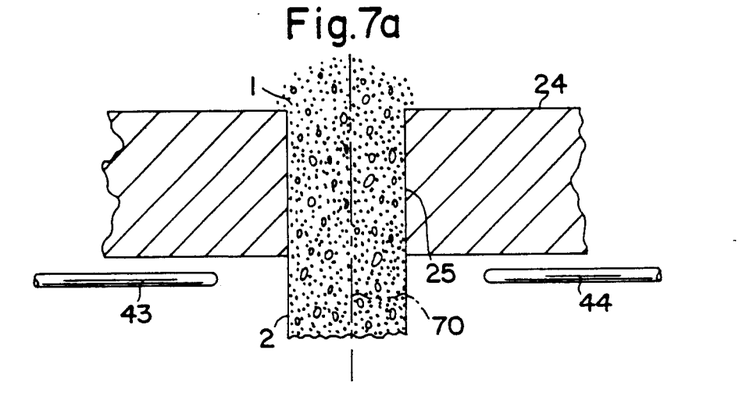
FIGS. 7a, 7b, and 7c are enlarged cross-sectional views illustrating the movement of the pins of the apparatus of FIG. 1 to separate a cookie preform.

FIGS. 7a, b and c illustrate consecutive steps in the process of separating a preform from a rope of dough containing food particles. In FIG. 7a dough mass 1 has been advanced through nozzle 25 to form a dough rope 2 ending below the plane of fingers 43 and 44. Fingers 43 and 44 are relatively close to the nozzle 25 to reduce the sway of the rope 2 as the fingers are inserted. This dough rope generally extends along longitudinal axis 70, which is substantially perpendicular to the plane of fingers 43 and 44.

Figure 7B:
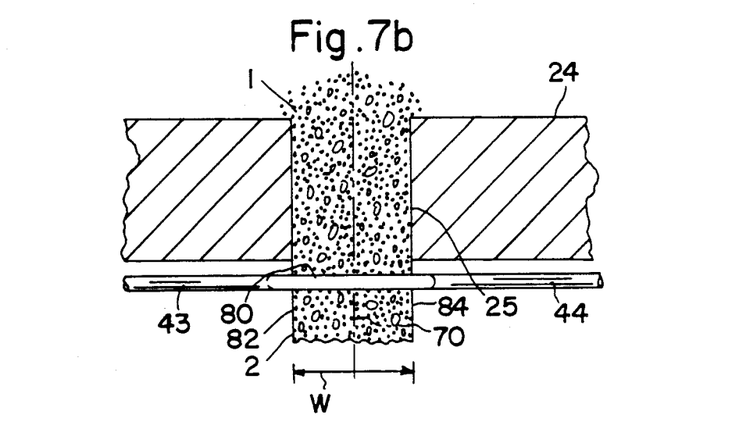

As illustrated in FIG. 7b, while dough rope 2 is temporarily held stationary due to the intermittent operation of dough feed roller 21, fingers 43 and 44 are then advanced into the dough rope 2 and any particle being engaged by the fingers will be gently pushed aside inside the dough rope, rather than pierced or split by said fingers. At this point, dough rope 2 has been perforated, with a width W and perforations 80 extending therethrough from one side 82 to the other side 84.

Figure 7C:
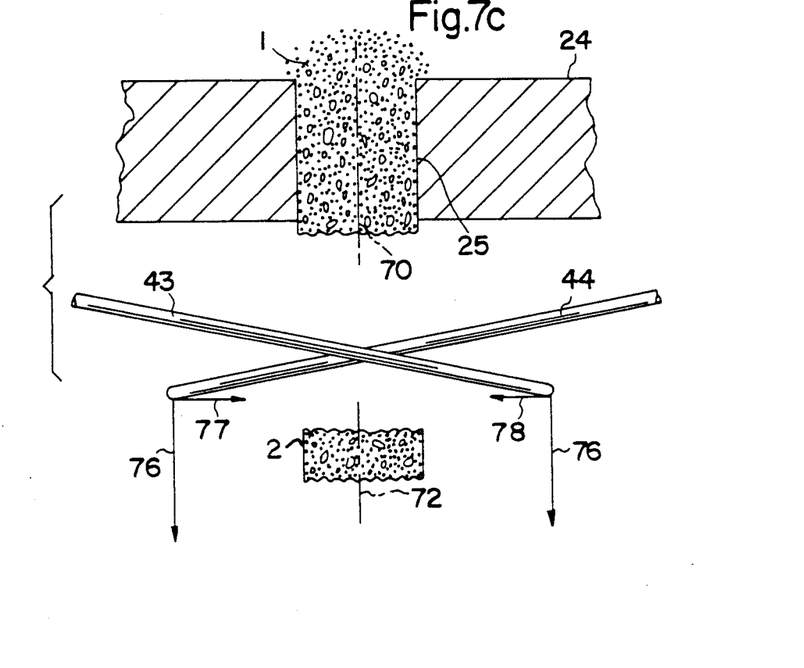

From the position shown in FIG. 7b, fingers 43 and 44 will pivot downwards to the position illustrated in FIG. 7c as a result of the pivoting of pin set lever 31 when roller 32 falls from pivoted rail 34 (FIG. 3). By this downward displacement of fingers 43 and 44 in a direction generally parallel to the longitudinal axis of the dough rope at a velocity relative to the velocity of the rope sufficient to stretch the rope to the breaking point, cookie preform 3 having a preform axis 72 corresponding to said longitudinal axis 70 will be separated from the dough rope and will fall down under the influence of gravity onto the conveyor belt. The shock when the lever roller 32 hits the fixed rail 33 (FIG. 3) will tend to cause the preform to not stick to fingers 43 and 44. The foregoing arrangement works in such a manner that the cookie preforms from a number of aligned nozzles drop vertically onto the moving conveyor belt 6, whereby the space available on the conveyor belt may be fully utilized, in particular when several dispensers are arranged sequentially along the same conveyor belt to dispense preforms in a coordinated pattern.

In the preferred embodiment, the separating operation is substantially accomplished during the intermittent stopping of the dough feed roller 21, such that the dough rope 2 is not moving downwardly at time of separation. That is, extrusion of the dough takes place only when the fingers 43, 44 are in the retracted position. When the desired amount of dough has been extruded, rotation of the dough feed roller 21 stops and fingers 43, 44 are inserted and drop to separate the preform. After separation of the preform, rotation of dough feed roller 21 restarts and more dough is extruded. However, it is also possible with proper timing to continuously extrude the dough.

The preforms are dropped so that the severed bottom falls substantially "squarely" or flat onto the moving belt. Also, the severing is such that the preform falls with substantially no lateral movement.

It can be seen that the rotation or pivoting of fingers 43 and 44 downwardly results not only in a downward component of velocity parallel to axis 70 as represented by vectors 76, but there are also sideways directed components 77 and 78 at substantially a right angle to said longitudinal axis 70. The downwardly directed component is substantially greater than the sideways directed component; however, this sideways component of the velocity of fingers 43 and 44 tends to have a shearing effect on the dough regions between the interdigitated fingers in a generally sideways direction.

After the step illustrated in FIG. 7c, the fingers retract to the position illustrated in FIG. 7a by lever roller 32 being retracted on fixed rail 33 as previously described in connection with FIG. 3. During retraction, dough feed roller 21 is advanced by lever 27 operating through the overrunning clutch 28 as described above so that dough rope 2 is advanced to the position shown in FIG. 7a. With an arrangement of fingers as illustrated in FIG. 4, the consecutive steps illustrated in FIG. 7a, 7b and 7c can be performed with a speed of operation in the order of 100 cycles per minute.

It may be desirable to include means for cleaning or wiping the fingers either periodically or after each forking operation to avoid dough buildup on the fingers.

Figure 8A:
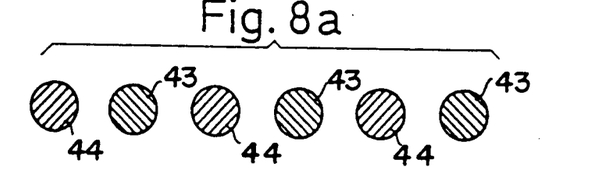
FIGS. 8a, 8b, 8c, and 8d are cross-sectional views illustrating examples of various alternative embodiments of pins that may be used in apparatus of the invention.
Figure 8B:
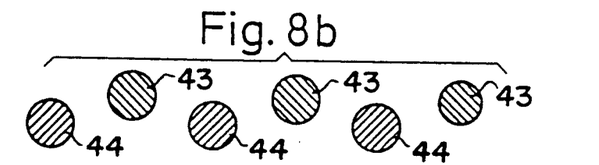
Figure 8C:
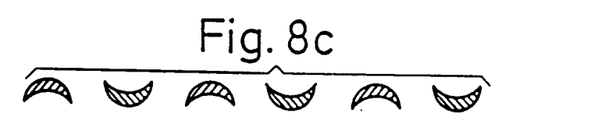
Figure 8D:
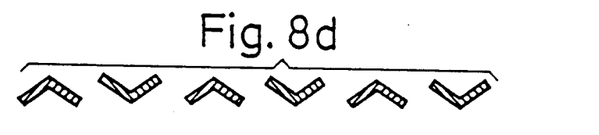

FIGS. 8a, 8b, 8c and 8d illustrate various forms and arrangements of fingers in cross-sections perpendicular to the finger axes and on the axis of a nozzle. Thus, the finger arrangements are shown in the position where the two sets of fingers overlap as in FIG. 6b and 7b. FIG. 8a illustrates a set of cylindrical fingers 43 and 44 being arranged substantially in the same plane corresponding to the embodiment shown in FIG. 7. However, numerous modifications and variations of the finger arrangement can be made, for example, so as to change the surface appearance of resulting cookie preforms or to affect the way in which food particles move when they are engaged by the fingers. FIG. 8b illustrates another embodiment where fingers 43 of pins 13 are displaced vertically relative to fingers 44 of pins 14. Preforms may thereby be produced having a coarser surface structure with more pronounced peaks or ridges and grooves or valleys than those produced with the embodiment of FIG. 8a. FIG. 8c illustrates a further embodiment, where the sets of fingers do not have a circular cross section but have a crescent-like cross-section, whereby yet another surface structure may be produced. Similarly, FIG. 8d illustrates another modification where the fingers are formed with an angular cross-section. Furthermore, the sizes, the number and the spacing of the fingers may be varied in accordance with the desired end result. Also, a combination of differently shaped fingers may be used to pierce a given dough piece.

Figure 9:
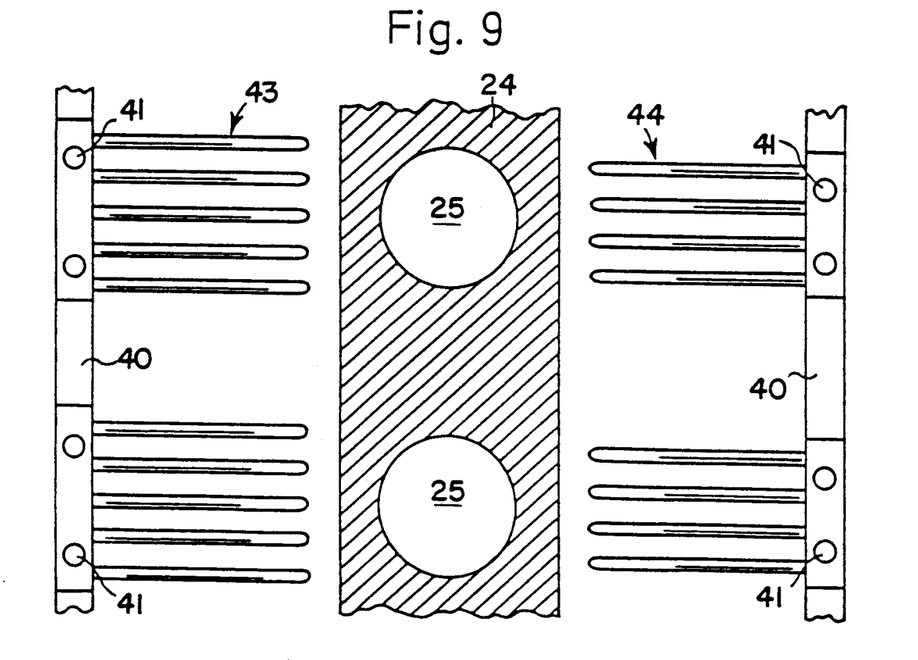
FIG. 9 is a horizontal sectional view corresponding to FIG. 6a, but showing a different arrangement of the pins.

In FIG. 9 is shown a horizontal partial view illustrating a further embodiment of the invention, wherein fingers 43 and 44 are only provided in the regions of nozzles 25.

Figure 10:
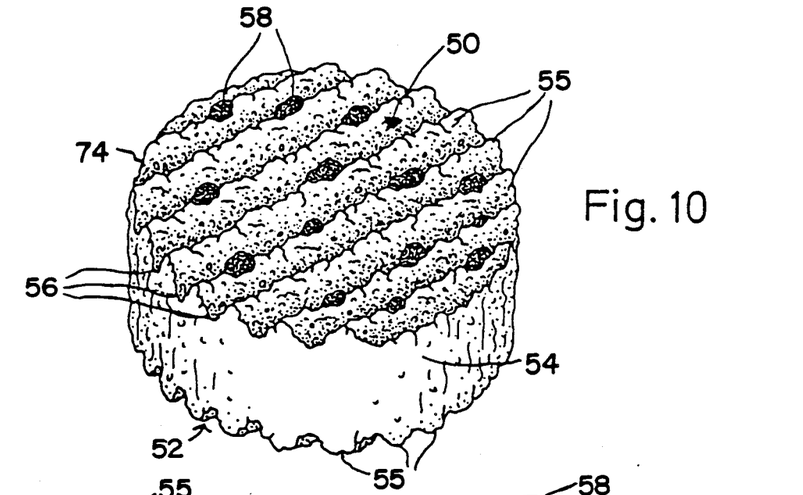
FIG. 10 is a schematic, perspective view of an embodiment of a cookie preform with food particles in accordance with the invention.

FIG. 10 illustrates a substantially circular cookie preform of the present invention comprising a top face 50, a bottom face 52 and an interconnecting side face 54, establishing the perimeter 74 of said preform. The cross-sectional area of the cookie preform may tend to be less than the cross-sectional area of the dough rope, because of the pulling or stretching action of the fingers. Both top face 50 and bottom face 52 have substantially parallel ridges 55 separated by substantially parallel grooves 56 extending along axes generally transverse to the preform axis. Grooves 56 generally open into said perimeter outside face. Visible food particles are illustrated at 58. The cookie preform illustrated in FIG. 10 may be produced by means of the apparatus illustrated in FIGS. 1–9 described above. Ridges 55 and grooves 56 result when fingers 43 and 44 perforate a dough rope having a substantially circular cross-section, and the grooves have a relatively smooth floor compared to the remainder of the preform surface by virtue of the action of the fingers. If the cookie dough does not contain morsels 58, ridges 55 and grooves 56 will form a uniform pattern. The ridges will generally have a non-uniform topography for a given ridge and from ridge to ridge because of the stretching of the portion in separating the preform from the remaining dough rope.

Figure 11:
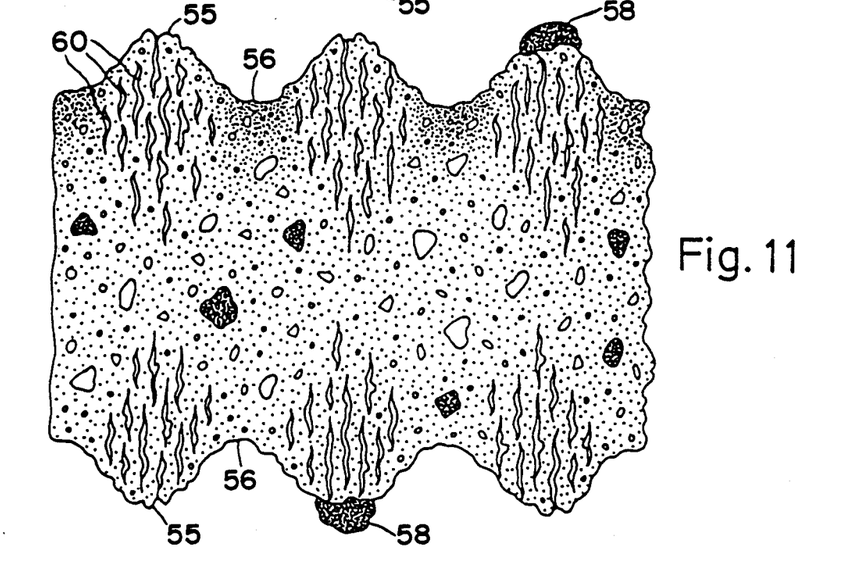
FIG. 11 is a schematic, partial cross-sectional view of the preform of FIG. 10 in transverse direction of the ridges illustrated in FIG. 10.
Figure 12:
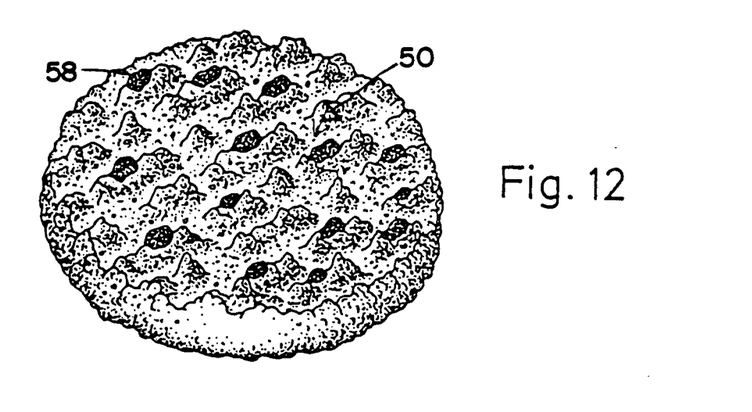
FIG. 12 is a schematic perspective view of a cookie baked from the preform illustrated in FIG. 10.

FIG. 11 is a schematic, partial cross-sectional view in a transverse direction to the ridges illustrated in the preform of FIG. 10. Ridges or areas having increased fissures or cracks or porosity or reduced density relative to the surrounding mass of cookie dough are illustrated by 60 resulting from stretching of the dough in the sections lying between fingers 43, 44 when the preform is separated from dough rope 2. It is believed that microscopic air pockets may be formed by "resealing" of portions of the stretched, cracked, or fissured dough. Although regions or areas of increased porosity or reduced density are illustrated as irregular, the invention is not limited to any specific appearance of such regions or areas of reduced density. FIG. 11 illustrates the effect of establishing passages that may facilitate the escape of gases during baking of the preform. Finally, FIG. 12 illustrates a cookie baked from the preform illustrated in FIG. 10. Top face 50 comprises randomly-distributed food particles 58 in a variably colored pattern of peaks, ridges, and grooves, with the overall topographical appearance being non-uniform.

Just as the dough regions between the fingers are stretched during the separation of the cookie preform from the dough rope and therefore likely have more cracks or fissures or lesser density than surrounding dough mass regions, the dough regions under the fingers tend to be more sealed somewhat by the action of the forks or finger means. Such relatively sealed areas would tend to be under the groove floors and extend part way into the dough mass therefrom.

The doughs of the present invention may contain more particles, also known as morsels or inclusions, than do conventional wire-cut doughs because the severing mechanism used in the present invention is less subject to breakage and is less likely to cause excessive lateral movement of the dough pieces. Generally, the larger the morsels, the higher the weight percentage of morsels that can be included in the dough. This is because the larger pieces have less total surface area for a given weight percentage of morsels, and a lesser amount of dough is needed for cohesiveness of the cookie preform. A typical chocolate chip wire-cut dough may have up to about 23% by weight of morsels or chocolate chips. However, the doughs of the present invention may have a morsel content of about 30% by weight to about 60% by weight.

The particulate flavoring ingredients, particles, inclusions, or morsels, prior to incorporation into the doughs of the present invention may suitably have a count per pound (i.e., the number of pieces per pound of morsels) of about 1,500 down to about 300. Typically, the large morsels will have a minimum dimension of at least about ¼". The amount of the large morsels can be at least about 10% by weight, typically from about 20% to about 60% by weight, based upon the total dough weight.

The cookie doughs may be of the soft variety or the crisp variety. The apparatus of the present invention may be used to cut or sever doughs that may be too sticky or too soft or too hard for cutting using a conventional wire cutter. Soft doughs that are so soft that they "flow back" or "seal back" after being cut by a wire can be severed with the apparatus of the present invention without resealing because of the downward movement of the finger or severing means that extends at least substantially through the extrudate dough in two substantially perpendicular directions. This movement pulls a portion of the dough away from the main dough mass to form a preform. Hard doughs, such as rotary doughs for sandwich cookies that are so hard that they result in frequent breaking of the wire, can also be severed with the apparatus of the present invention.

EXAMPLE 1

A cookie dough was mixed from suitable amounts of biscuit flour, margarine, sugar and water in proportions giving a relatively short dough being suitable for splitting on a conventional wire-cutting apparatus. Such a dough is hereinafter called a basic dough.

In such a basic dough was furthermore included desiccated coconut, chopped hazelnuts and coarse oatmeal.

Cookie preforms from the prepared dough were made both with a conventional wire-cutter and with a finger-cutter according to the invention. Each cookie preform weighed from 19 to 21 g and was baked in an oven on a conveyor belt at a temperature of 190° C.

All preforms were baked to an attractive light brown surface color, whereby the finger-cut preforms required a baking time of 12.0 minutes, whereas the wire-cut preforms required a baking time of 13.5 minutes. Both types of preforms lost approximately 10% in weight during baking.

The baked cookies were sealed in an airtight wrapping and stored at ambient temperature for 6 days, whereafter they were subjected to a panel who found that the finger-cut cookie was crisper, contained fewer cracks and had a more pleasing home-made surface appearance than the wire-cut cookie, which despite of the longer baking time was judged as not having been fully baked.

EXAMPLE 2

In the basic dough of Example 1 was included desiccated coconut, chopped hazelnuts, oatmeal and ammonium bicarbonate as a leavening agent.

Cookie preforms from the prepared dough were made both with a conventional wire-cutter and with a finger-cutter according to the invention. Each cookie preform weighed from 19 to 21 g and was baked in an oven on an conveyor belt at a temperature of 200° C.

In this case, both the wire-cut preforms and the finger-cut preforms were baked for 13.5 minutes, and the loss of weight was again 10% for both types of preforms.

The baked cookies were sealed in an airtight wrapping and stored at ambient temperature for 6 days, whereafter they were subjected to a panel who found that the finger-cut cookie was crisper, contained fewer cracks and had a more pleasing home-made surface appearance than the wire-cut cookie.

EXAMPLE 3

In the basic dough of Example 1 sugar was replaced by brown sugar and icing sugar, and there was furthermore included desiccated coconut, chopped hazelnuts, corn starch, cocoa, sodium chloride, ammonium bicarbonate and sodium bicarbonate.

Cookie preforms from this dough were made in accordance with Example 1 and baked at a temperature of 200° C. As in Example 2, both the finger-cut preforms and the wire-cut preforms were baked for 13.5 minutes, and the loss of weight was again 10% for both types of preforms.

The baked cookies were sealed in an airtight wrapping and stored at ambient temperature for 6 days, whereafter they were subjected to a panel who found that the finger-cut cookie was hard and crisp, it had a good taste and a home-made appearance with many raised peaks and ridges in the surface. The wire-cut cookie was found to be less crisp than the finger-cut cookie, it left an unpleasant taste of ammonia and the surface appearance was flat with numerous randomly distributed cracks.

I claim:

1. Apparatus for forming a cookie preform from a formed mass of cookie dough having a longitudinal axis, said apparatus comprising means for extruding a mass of cookie dough, means for perforating said mass of cookie dough transversely to said longitudinal axis, means for moving the means for perforating along the longitudinal axis of said mass of dough to stretch said mass in the area of perforation to its breaking point to thereby separate a portion of dough from the remainder of said mass of dough, the separated portion constituting said cookie preform said means for perforating being positioned relative said means for extruding such as to perforate the dough mass at a location where the dough is suspended from the means for extruding.

2. The apparatus of claim 1, wherein said means for perforating comprise a plurality of parallel fingers.

3. The apparatus of either claim 1 or 2, wherein said means for perforating comprise two sets of parallel fingers on opposed sides of said mass of cookie dough, each set being movable from a first position on one side of said mass of cookie dough to a second position wherein said fingers perforate said mass of cookie dough transverse to said longitudinal axis, said fingers further being movable relative to said mass of cookie dough in the direction of said longitudinal axis to separate the dough mass in the area of perforation to yield a portion of dough as the cookie preform.

4. The apparatus of claim 3, wherein said fingers of said two sets are interdigitated.

5. An apparatus for making a dough preform, comprising:
means for forming an elongated dough rope,
means for advancing the leading end of said dough rope along the longitudinal axis of said rope;
means for forming a plurality of lines of weakness in the dough rope proximate said leading end and transverse to said longitudinal axis; and
means for separating a dough preform from the dough rope by stretching the dough rope in the direction of the longitudinal axis and breaking it along the lines of weakness, the preform comprising the portion of dough extending from the lines for forming the dough rope of weakness to the leading end said lines of weakness being positioned relative the means for forming a dough rope such as to form the lines of weakness in the dough portion that is suspended from the means for forming the dough rope.

6. An apparatus according to claim 5, wherein said means for forming a plurality of lines of weakness in the dough rope comprise a plurality of parallel fingers and means for moving the fingers in a plane intersecting the longitudinal axis to penetrate the dough rope.

7. An apparatus according to claim 6, which includes two sets of parallel fingers and means for moving them in opposition to each other.

8. An apparatus according to claim 7, wherein said two sets of fingers are in interdigitated alignment during penetration of the dough rope.

9. An apparatus according to claim 6, wherein said means for separating a dough preform from the dough rope comprise means for moving the fingers in a direction parallel to the longitudinal axis after penetration of the dough rope.

10. An apparatus according to claim 9, which further includes means for interrupting movement of the dough rope along the forming axis during penetration of the dough rope by the fingers.

11. An apparatus according to claim 9, which further includes means for interrupting movement of the dough rope along the forming axis during penetration of the dough rope by the fingers.

12. An apparatus for preparing a cookie dough preform having a pattern of ridges on its upper surface, comprising means for forming an elongated dough rope:
means for advancing the leading end of the dough rope along the longitudinal axis of the dough rope;
means comprising a plurality of fingers for penetrating the dough rope and forming lines weakness in it proximate said leading end and transverse to said longitudinal axis; and
means for moving the fingers relative to the dough rope and parallel to said longitudinal axis to stretch the dough rope and break it along the lines of weakness to thereby form a preform having a pattern of ridges on its upper surface said fingers being positioned relative the means for forming a dough rope at a location where the rope is suspended from the means for forming a dough rope.

13. An apparatus according to claim 12, which includes two sets of parallel fingers and means for moving them in opposition to each other.

14. An apparatus according to claim 13, wherein said two sets of fingers are in interdigitated alignment during penetration of the dough rope.

* * * * *